US009712834B2

United States Patent
Su et al.

(10) Patent No.: US 9,712,834 B2
(45) Date of Patent: Jul. 18, 2017

(54) HARDWARE EFFICIENT SPARSE FIR FILTERING IN VIDEO CODEC

(71) Applicant: Dolby Laboratories Licensing Corporation, San Francisco, CA (US)

(72) Inventors: Guan-Ming Su, Fremont, CA (US); Qian Chen, San Jose, CA (US); Peng Yin, Ithaca, NY (US); Sheng Qu, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 258 days.

(21) Appl. No.: 14/488,415

(22) Filed: Sep. 17, 2014

(65) Prior Publication Data

US 2015/0092847 A1    Apr. 2, 2015

Related U.S. Application Data

(60) Provisional application No. 61/885,377, filed on Oct. 1, 2013.

(51) Int. Cl.
*H04N 19/33* (2014.01)
*H04N 19/86* (2014.01)
*H04N 19/85* (2014.01)

(52) U.S. Cl.
CPC ............. *H04N 19/33* (2014.11); *H04N 19/85* (2014.11); *H04N 19/86* (2014.11)

(58) Field of Classification Search
CPC ............................... H04N 19/82; H04N 19/93
See application file for complete search history.

(56) References Cited

U.S. PATENT DOCUMENTS

| 7,747,100 | B2 | 6/2010 | Kim | |
|---|---|---|---|---|
| 8,073,282 | B2 | 12/2011 | Teng | |
| 8,811,490 | B2 * | 8/2014 | Su | H04N 19/105 375/240.12 |
| 8,873,877 | B2 | 10/2014 | Su | |
| 2007/0286515 | A1 * | 12/2007 | Kim | H04N 19/117 382/254 |
| 2009/0257664 | A1 | 10/2009 | Kao | |

(Continued)

FOREIGN PATENT DOCUMENTS

WO        97/42601        11/1997

OTHER PUBLICATIONS

Atzori, L. et al "Adaptive Anisotropic Filtering (AAF) for Real-Time Visual Enhancement of MPEG-Coded Video Sequences" IEEE Transactions on Circuits and Systems for Video Technology, vol. 12, No. 5, May 1, 2002.

*Primary Examiner* — Dave Czekaj
*Assistant Examiner* — Tsion B Owens

(57) ABSTRACT

In an embodiment, a control map of false contour filtering is generated for a predicted image. The predicted image is predicted from a low dynamic range image mapped from the wide dynamic range image. Based at least in part on the control map of false contour filtering and the predicted image, one or more filter parameters for a sparse finite-impulse-response (FIR) filter are determined. The sparse FIR filter is applied to filter pixel values in a portion of the predicted image based at least in part on the control map of false contour filtering. The control map of false contour filtering is encoded into a part of a multi-layer video signal that includes the low dynamic range image.

18 Claims, 11 Drawing Sheets

(56) References Cited

U.S. PATENT DOCUMENTS

| | | |
|---|---|---|
| 2010/0128803 A1 | 5/2010 | Divorra Escoda |
| 2011/0194618 A1* | 8/2011 | Gish ........................ G06T 5/50 375/240.25 |
| 2012/0321205 A1 | 12/2012 | Lai |
| 2013/0148029 A1 | 6/2013 | Gish |
| 2013/0148907 A1 | 6/2013 | Su |
| 2014/0247869 A1* | 9/2014 | Su .................... H04N 19/00096 375/240.03 |
| 2014/0294313 A1* | 10/2014 | Su ........................... G06T 9/00 382/239 |
| 2014/0363093 A1* | 12/2014 | Miller ....................... G06F 3/14 382/235 |
| 2015/0195566 A1* | 7/2015 | Hinz ................... H04N 19/105 375/240.13 |

\* cited by examiner

HARDWARE EFFICIENT SPARSE FIR FILTERING IN VIDEO CODEC

CROSS REFERENCE TO RELATED APPLICATIONS

This application claims the benefit of priority to U.S. Provisional Patent Application Ser. No. 61/885,377, filed on Oct. 1, 2013, and entitled, "Hardware Efficient Sparse FIR Filtering in Video Codec," which is incorporated herein by reference in its entirety.

TECHNOLOGY

The present invention relates generally to image processing, and in particular, to encoding, decoding, and representing video images.

BACKGROUND

Multiple layers may be used to deliver video data from an upstream device such as a multi-layer video encoder to downstream devices. For example, visual dynamic range (VDR) video data can be carried in the combination of a base layer and an enhancement layer (EL) of the multiple layers for viewing experience of VDR displays. BL image data may be encoded with low or partial dynamic range (e.g., SDR, etc.) image data derived from VDR images. EL image data may be encoded with residual image data which, along with image data predicted from the BL image data enables a downstream recipient system to reconstruct a version of the VDR images.

Different code words mapped from the VDR images may be collapsed into a same value in the BL image data representing an SDR image at an upstream device. Textual variations and image details represented in the VDR images may be lost in the BL image data. When the recipient system performs a prediction operation from low bit depth BL image data to high bit depth VDR image data, contouring artifacts often occur as a result of one-to-many mappings in the prediction operation.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
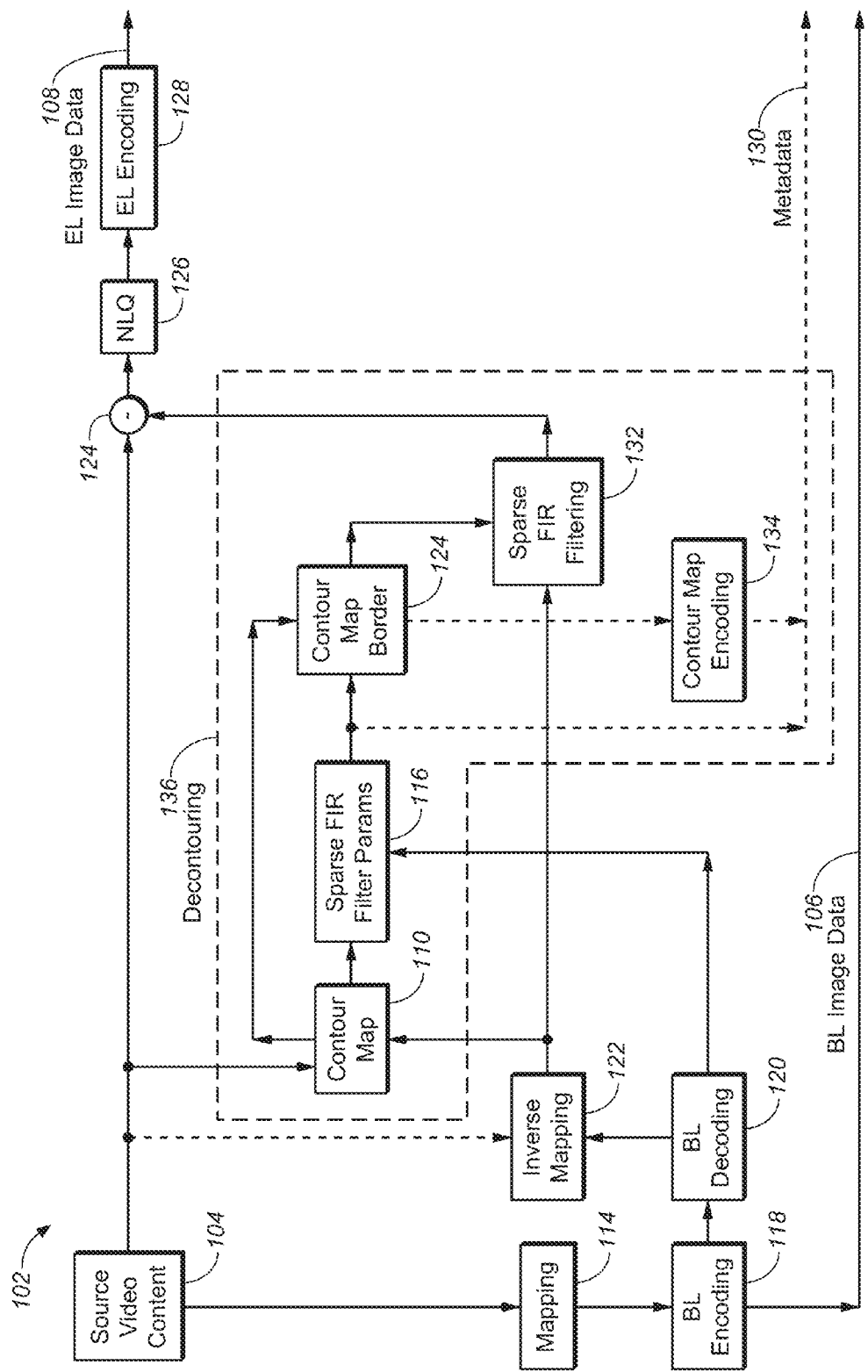
FIG. 1 illustrates a multi-layer video encoder.

Example embodiments, which relate to encoding, decoding, and representing video images using a multi-layer codec, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. DECONTOURING FILTERING
3. MULTI-LAYER VIDEO ENCODING
4. MULTI-LAYER VIDEO DECODING
5. EXAMPLE IMPLEMENTATIONS
6. EXAMPLE PROCESS FLOWS
7. IMPLEMENTATION MECHANISMS—HARDWARE OVERVIEW
8. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

In some embodiments, multi-layer codecs may be used to generate or process a media signal comprising compressed images (e.g., video images) for a wide variety of displays (e.g., VDR displays, etc.). To provide superior visual quality on a wide variety of wide and low dynamic range displays, video content to be released to downstream devices can be quantized and encoded by a multi-layered codec implementing filtering techniques as described herein.

As used herein, the term "multi-layer codec" may refer to a multi-layer encoder or decoder that implements a structure of multiple layers in an audio visual signal (e.g., a bitstream, a broadcast signal, a media file, etc.). The multiple layers comprise a base layer and one or more enhancement layers. The base and enhancement layers comprise image data derived from the same source images. Image data in the base layer contains compressed image data of a low or partial dynamic range, which may not be optimized for rendering on displays of a relatively low dynamic range such as a standard dynamic range or SDR. Image data in the multiple layers in combination contains compressed images of a wide dynamic range, which can be decoded and viewed on displays of a relatively wide dynamic range such as a visual dynamic range or VDR. The term "VDR" or "visual dynamic range" as used herein may refer to a dynamic range wider than a standard dynamic range, and may include, but is not limited to, a wide dynamic range up to the instantaneously perceivable dynamic range and color gamut which human vision can perceive at an instant.

A multi-layer codec as described herein may be implemented with two or more lower bit depth (e.g., 8 bits, etc.) codecs (e.g., gamma-domain codecs, etc.) in the multiple layers in order to support higher bit depth (e.g., 12+ bits, etc.) images in the multiple layers as a whole and to support lower bit depth (e.g., 8 bits, etc.) images in the base layer.

Codecs implementing techniques as described herein may be further configured to include inter-layer prediction capabilities to fully exploit statistical redundancy between base layer (BL) image data and original input image data. EL image data may (possibly only) carry residual (or differential) image data, instead of carrying a large amount of wide dynamic range image data without exploiting correlations and statistical redundancy in image data of different layers.

Prediction from low bit depth SDR image data to high bit depth VDR image data often brings about contouring artifacts, because of one-to-many (e.g., 8-bit in SDR to 12+ bit VDR, etc.) mappings during inverse mapping in such a prediction. Post-processing methods may be used by a downstream decoder to alleviate the contouring artifacts. However, these methods have relatively high computation complexity, are not hardware efficient, and incur relatively high manufacturing costs.

Techniques as described herein may be used to enhance prediction of wide or high dynamic range image data based on relatively low bit depth (e.g., 8 bits, etc.) image data in a base layer and reduce false contouring artifacts in reconstructed wide or high dynamic range (e.g., 12+ bits VDR, etc.) images. The techniques can improve bit depth expansion in the false contouring area significantly both perceptually and objectively.

In some embodiments, decontouring techniques as described herein include sparse FIR filtering on predicted image data, coding of a control map of false contour filtering, etc. False contouring artifacts can be effectively removed by performing decontouring filtering in the predicted image data using sparse FIR filters, even with significantly fewer filter taps. Thus, the decontouring techniques as described herein can be used to avoid using a significant number of line buffers in a SoC implementation, a software and/or hardware component, etc. In addition, whether to turn on or off filtering on individual pixels can be simply determined by whether these individual pixels are within specific areas demarcated on a control map of false contour filtering or without. Thus, filtering operations under techniques as described herein can be uniformly performed with no complex non-linear/back-forth control logic and memory to determine whether filtering should be turned on or off.

In some embodiments, decontouring operational data (e.g., a control map of false contour filtering, sparse finite impulse response (FIR) filtering parameters, etc.) may be generated by an upstream encoder and transmitted by the upstream encoder to downstream decoders. In some embodiments, to generate a control map of false contour filtering, a residual image comprising differences between a predicted image predicted from a SDR image tone mapped from an original VDR image and the original VDR image is first created. Standard deviations may be computed for individual pixels in the residual image. The standard deviations are then used to generate the control map of false contour filtering that determines whether a pixel in the predicted image is in image portions of the VDR image that are not likely to have false contours in the predicated image (e.g., complex image portions of the original VDR image, original smooth area of the original VDR image, etc.), or in image portions of the VDR image that are likely to have false contours in the predicated image, etc.

In various embodiments, the number of taps in a sparse FIR filter used by techniques as described herein may be pre-configured, fixed, user configurable, etc. In some embodiments, the number of taps (e.g., 5, 7, etc.) is determined by hardware, for example, available in a downstream recipient device. In some embodiments, a sum of filter coefficients of all the taps in the sparse FIR filter may be constrained to a fixed value such as one (1), etc. In some embodiments, some or all filter coefficients are equal. In some embodiments, at least two filter coefficients are different; for example, a tap representing a closer pixel (e.g., with a smaller tap index value, etc.) may be assigned a smaller or larger weight than a tag representing a farther pixel (e.g., with larger tap index value, etc.).

As compared with other methods (e.g., post-processing methods as mentioned above, etc.), techniques as described herein are hardware efficient and are based on relatively simple and high performing (e.g., system-on-chip or SoC based, etc.) implementations, and incurs relatively low manufacturing costs.

In some embodiments, techniques as described herein can be implemented in backward-compatible multi-layer video codecs. A backward compatible multi-layer video codec supports encoding or decoding a video signal in which BL data comprises SDR images optimized for viewing on SDR displays.

In some example embodiments, data needed for other applications (including but not limited to those not related to filtering operations, etc.) may also be included with base layer and enhancement layer image data to be delivered from an upstream device to a downstream device. In some example embodiments, additional features and/or orthogonal features may be supported by the base and enhancement layers as described herein.

In some example embodiments, mechanisms as described herein form a part of a media processing system, including but not limited to any of: a handheld device, game machine, television, laptop computer, netbook computer, tablet computer, cellular radiotelephone, electronic book reader, point of sale terminal, desktop computer, computer workstation, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Decontouring Filtering

Techniques (e.g., algorithms, etc.) as described herein can be used by a multi-layer encoder to encode source video content into a multi-layer video signal that preserves visual details of the source video content in BL image data as well as in the combination of BL and EL image data. In some embodiments, the source video content is originally encoded with the source code words in a source encoding format (e.g., as defined by a VDR specification, etc.) based on video encoding techniques (e.g., VDR encoding techniques developed by Dolby Laboratories, Inc., San Francisco, California, etc.).

The multi-layer video signal generated by a multi-layer encoder as described herein can be transmitted directly or indirectly to or received by a wide variety of downstream devices including but not limited to, any of: display systems with multi-layer decoders, display systems with base-layer decoders, etc.

A downstream device (e.g., a multi-layer decoder, etc.) that supports relatively wide dynamic range display operations can derive and/or render a wide dynamic range version of the source video content based on the received multi-layer video signal. A downstream device (e.g., a BL decoder, etc.) that supports relatively low dynamic range display operations can derive and/or render a decoded low dynamic range version with visual details of the source video content based on BL image data of the received multi-layer video signal.

FIR filtering under other approaches that do not implement techniques as described herein needs neighboring pixels as input to get an output filtered value of a pixel. In these other approaches, depending on the picture resolution and the bit depth difference, the number of taps in FIR filtering is often very large, for example, more than 30 to 50 in order to remove sharp stair transitions and around 100 in order to have very smooth transition. To perform such FIR filtering in hardware, a filtering module would use at least 30 line buffers, each of which may have 1920 pixels—e.g., each pixel takes a VDR bit depth such as 16 bits, etc.—for high definition (HD) images and 3820 pixels for ultrahigh definition (UHD) images. Thus, to implement such FIR filtering, the total required expensive memory (e.g., SRAM, etc.) may be 115K bytes for HD images and 230 Kbytes for UHD images, resulting in very high hardware costs.

However, due to quantization, an image may comprise same value pixels along horizontal and/or vertical directions. Applying dense filtering that includes many neighboring pixels for the purpose of decontouring may not be efficient.

In contrast, techniques as described herein use sparse FIR filtering for the purpose of decontouring. In some embodiments, sparse FIR filtering as described herein may be defined in an example expression as follows:

$$\hat{y}[n] = \sum_{i=-u}^{u} w_i x[n + s[i]] \quad (1)$$

where $w_i$ is the i-th filter coefficient, $x[n]$ is the input signal, $\hat{y}[n]$ is the output filtered signal, $s[i]$ is the distance for the sparse input signal, $2u+1$ is the number of filter taps.

In an example implementation, a sparse FIR filter is used to provide coverage spanning over 99 consecutive pixels with 5 taps (e.g., u=2 in expression (1), etc.), or s[2]−s[−2]=99. Each tap of the sparse FIR filter has a filter coefficient $w_i$ of 0.2. The VDR image may be in HD resolution, whereas a corresponding SDR image may be color graded and/or tone-mapped from the VDR image with a display management algorithm to a certain bit rate (e.g., 8 Mbps, etc.) in quarter HD resolution.

Besides the perceptual results, TABLE 1 depicts PSNR (Peak Signal to Noise Ratio) results for an example implementation of sparse FIR filtering. Sparse FIR filtering provides a 1.5 dB improvement in terms of PSNR as shown in the following table:

TABLE 1

| Decontouring Type | PSNR (dB) |
| --- | --- |
| Predicted VDR | 78.9347 |
| Predicted VDR + sparse FIR with 5 taps (span 99) | 80.4011 |
| Predicted VDR + dense FIR with 99 taps | 80.7105 |

Thus, sparse FIR filtering can effectively replace high cost dense filtering and significantly alleviate false contouring artifacts in predicted images. In some embodiments, a sum of filter coefficients of all the taps in the sparse FIR filter may be constrained to a fixed value such as one (1), etc. In some embodiments, a sparse FIR filter as described herein may be a symmetric filter, for example, $s[i]=s[-i]$ for all i. In some embodiments, filter coefficients may be set to the same value, for example, $w_i=1/(2u+1)$. In some embodiments, at least two filter coefficients are different; for example, a tap representing a closer pixel (e.g., with a smaller tap index value, etc.) may be assigned a smaller or larger weight than a tag representing a farther pixel (e.g., with larger tap index value, etc.). In some embodiments, an equal distance may be set between each pair of neighboring filter taps, for example, $s[i+1]-s[i]=s[i]-s[i-1]$. In some embodiments, different distances may be set between at least two pairs of neighboring filter taps; for example, there may exist i and j such that $s[i+1]-s[i]$ does not equal $s[j+1]-s[j]$.

3. Multi-Layer Video Encoding

Figure 2:
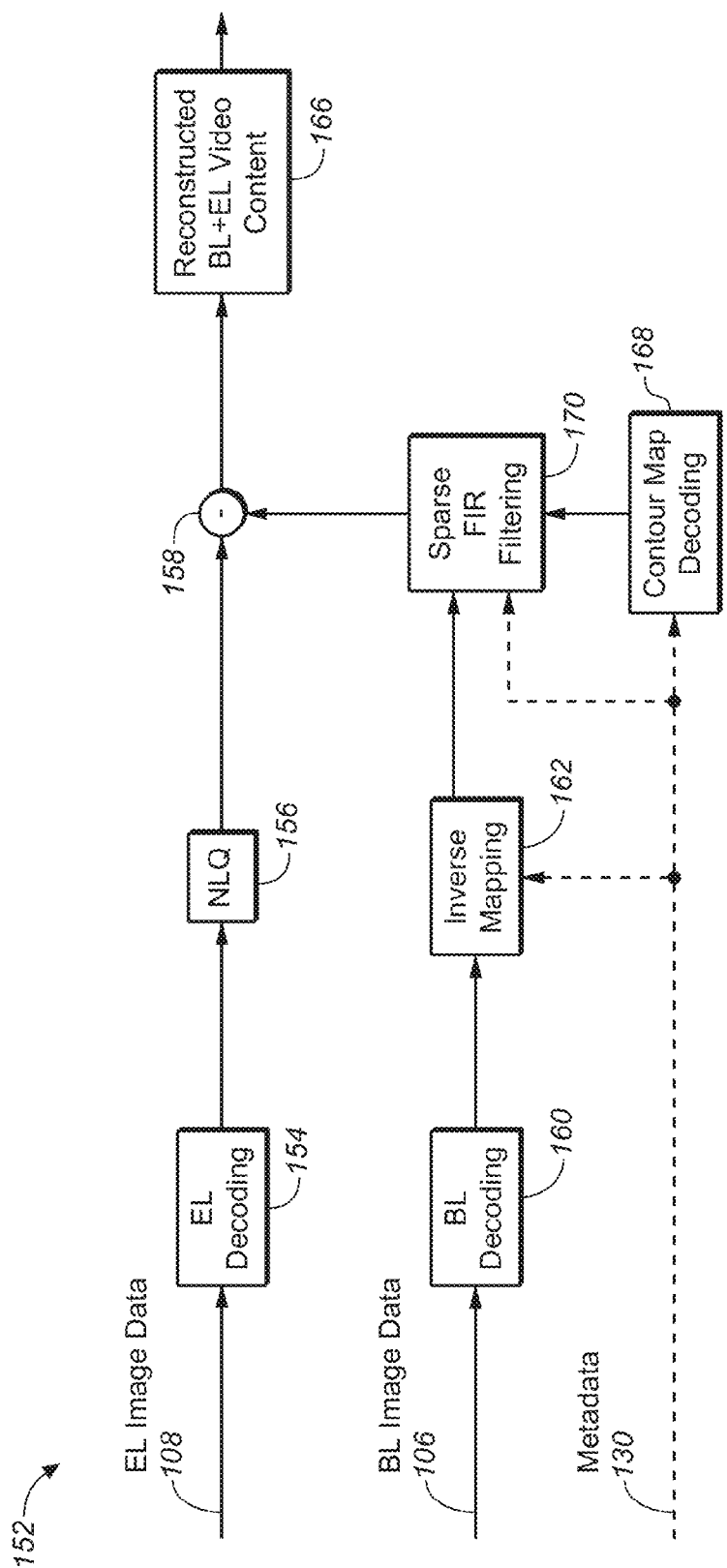
FIG. 2 illustrates a multi-layer video decoder.

As previously noted, a multi-layer video signal (e.g., coded bitstream, etc.) comprising a base layer and one or more enhancement layers can be used by an upstream device (e.g., a multi-layer encoder 102 of FIG. 1) to deliver video content encoded to downstream devices (one of which may be, for example, a multi-layer decoder 152 of FIG. 2, etc.). In some embodiments, the video content delivered by the multiple layers comprises BL image data (e.g., 106 of FIG. 1, FIG. 2, etc.) of a relatively low bit depth and EL image data (e.g., 108 of FIG. 1, and FIG. 2, etc.) complementary to the BL image data. Both the BL image data (106) and the EL image data (108) are derived/quantized from the relatively high bit depth (e.g., 12+ bit VDR, etc.) source video content (104).

In some embodiments, the BL image data (106) is placed in a base layer container (e.g., an 8-bit YCbCr 4:2:0 container, etc.). In some embodiments, the EL image data (108) comprises residual image data of the (e.g., VDR, etc.) source video content (104) relative to predicted image data generated from the BL image data (106). In some embodiments, the EL image data (108) is placed in one or more enhancement layer containers (e.g., one or more 8-bit residual data containers, etc.). The BL image data (106) and the EL image data (108) may be received and used by the downstream devices (e.g., 152 of FIG. 2, etc.) to reconstruct a relatively high bit depth (e.g., 12+ bits, etc.) decoded version (e.g., a perceptually decoded VDR version, etc.) of the (e.g., VDR, etc.) source video content (104).

As used herein, the term "bit depth" refers to the number of bits provided in a coding space that provides available code words to encode or quantize image data; an example of low bit depth is 8 bits; an example of high bit depth is 12 bits or more. In particular, the term "a low bit depth" or "a high bit depth" does not refer to the least significant bits or the most significant bits of a code word.

In an example embodiment, the multi-layer encoder (102) is configured to receive the (e.g., VDR, etc.) source video content (104) comprising a sequence of input VDR images. The sequence of input VDR images represents one or more scenes each of which comprises a plurality input images in the sequence of VDR images. As used herein, an "input VDR image" generally refers to wide or high dynamic range image data that may be used to derive a VDR version of a source image (e.g., a scene-referred image captured by a high-end image acquisition device, etc.). An input VDR image may be in any color space that supports a high dynamic range color gamut. In some embodiments, the input VDR image is the only input, relative to the source image, that provides image data for the VDR image encoder (102) to encode; input image data, relative to the source image, for base layer processing under techniques as described herein may be generated based on the input VDR image using tone mapping and/or quantization techniques.

In an example embodiment, an input VDR image decoded from the (e.g., VDR, etc.) source video content (104) is a 12+ bit YCbCr image in a YCbCr color space. In an example, each pixel represented in the input VDR image comprises code words for all channels (e.g., luminance channel Y, chroma channels Cb and Cr, etc.) defined for a color space (e.g., a YCbCr color space, etc.). Each code word comprises upsampled or downsampled code words for one or more of the channels in the color space.

In an example embodiment, the multi-layer encoder (102) is configured to transform code words of an input VDR image from a first color space (e.g., an RGB color space, etc.) to a second different color space (e.g., a YCbCr color space, etc.).

In an example embodiment, the multi-layer encoder (102) is configured to downsample or upsample an input VDR image in a first sampling format (e.g., in a 4:4:4 sampling format, etc.) to a second different sampling format (e.g., in a 4:2:0 sampling format, etc.).

In an example embodiment, the multi-layer encoder (102) is configured to perform operations related to tone mapping and/or quantization on the source video content (104) to generate the (e.g., 8-bit, etc.) BL image data (106). The operations related to tone mapping and/or quantization include but are not limited to one or more of: mapping operations (114), BL encoding operations (118), etc.

In the mapping operations (114), the multi-layer encoder (102) is configured to use a mapping function to map (e.g., 12 bit+, etc.) input VDR code words in one or more input VDR images in the (e.g., VDR, etc.) source video content (104) into mapped code words in one or more mapped images corresponding to the one or more VDR images. Mapping (114) may apply linear or non-linear high dynamic range to standard dynamic range mapping techniques as known in the art.

The number (e.g., <=256 at a bit depth of 8 bits, etc.) of available code words at the bit depth of the BL image data (106) may not be large enough to accommodate the entire numeric range of the source code words. Thus, a mapped code word in the one or more mapped images may correspond to multiple source code words.

In the BL encoding operations (118), the output of mapping (114) is compressed to be transmitted as coded BL stream 106 to a downstream decoder (e.g., 152). BL Encoding (118) may comprise any known or future video encoder, such as one described by the MPEG-2, MPEG-4, H.264, HEVC, and the like, specifications.

As depicted in FIG. 1, in an example embodiment, the multi-layer encoder (102) is configured to perform one or more EL operations. The one or more EL operations include but are not limited to, any of: BL decoding operations (120), prediction operation (122), subtraction operations (124), nonlinear quantization operators (126), EL encoding operations (128), a set of decontouring operations (136), etc. In some embodiments, the set of decontouring operations (136) includes, but is not necessarily limited to, any of a contour map operation (110), a sparse-FIR-filter-parameters operation (116), a contour map border operation (124), a contour map encoding operation (134), a sparse FIR filtering operation (132), etc.

In the BL decoding operations (120), the multi-layer encoder (102) is configured to decode the (e.g., 8 bit, etc.) BL image data (106) in the (e.g., 8-bit, etc.) BL image containers back into mapped code words in one or more mapped images that correspond to the one or more input VDR images.

In the prediction, or inverse mapping operation (122), the multi-layer encoder (102) is configured to inversely map the mapped (BL) code words into VDR code words based on an inverse of the mapping (e.g., content mapping, etc.) used in Mapping (114). An example of such a predictor is described in PCT Application with Ser. No. PCT/US2012/033605, filed on Apr. 13, 2012, titled "Multiple Color Channel Multiple Regression Predictor," incorporated herein by reference in its entirety.

In some embodiments, the multi-layer encoder (102) is configured to implement BL-to-EL prediction (e.g., intra and/or inter prediction, etc.) in order to reduce the amount of EL image data that needs to be carried in the EL layers for reconstructing VDR images by a downstream device (e.g., a multi-layer decoder 152 of FIG. 2, etc.). The multi-layer encoder (102) can generate, based at least in part on the VDR code words obtained through the prediction operation (122), prediction image data.

Figure 3A:
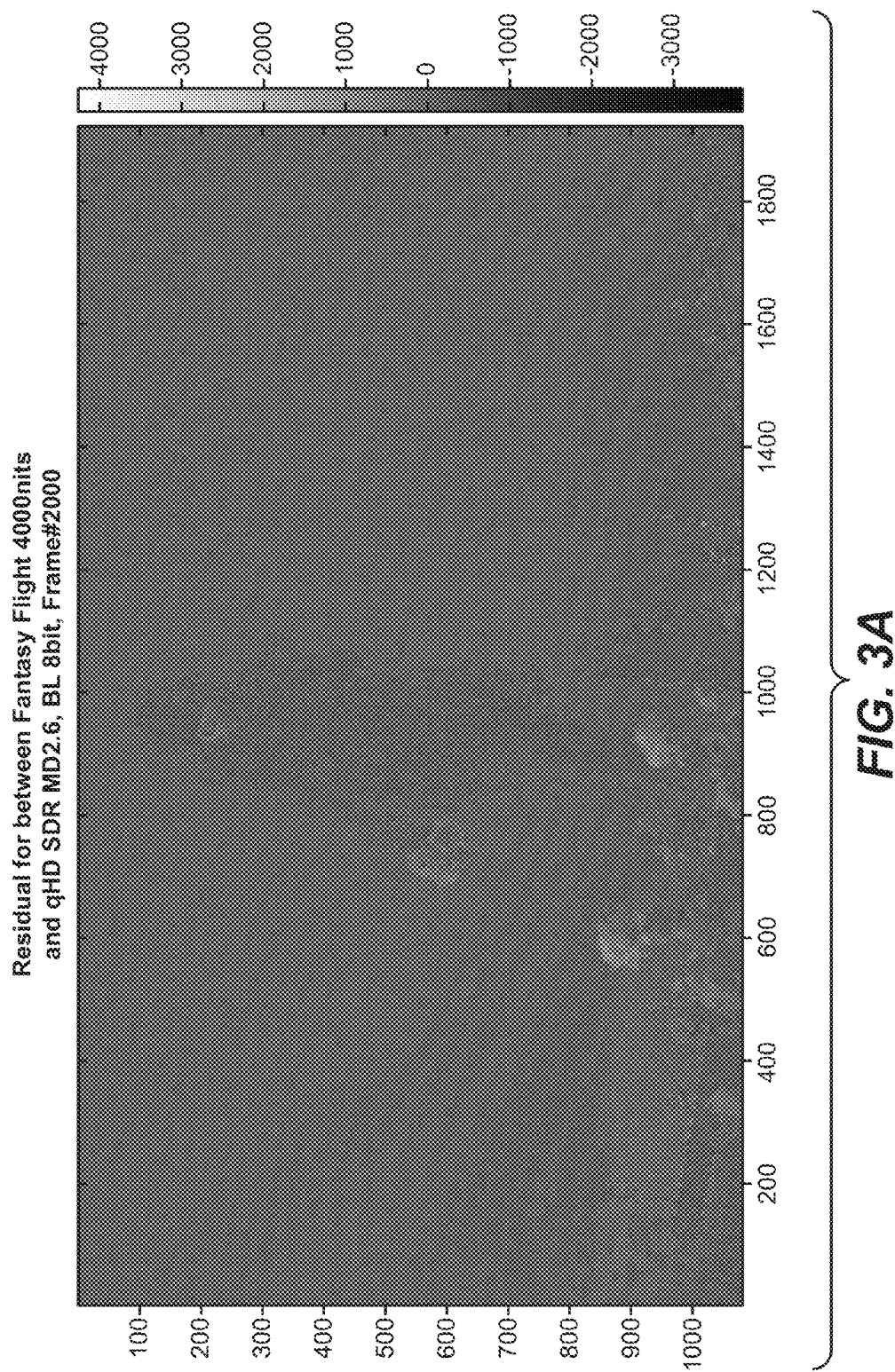
FIG. 3A through FIG. 3G illustrate example control maps and images relating to false contour filtering.
Figure 3B:
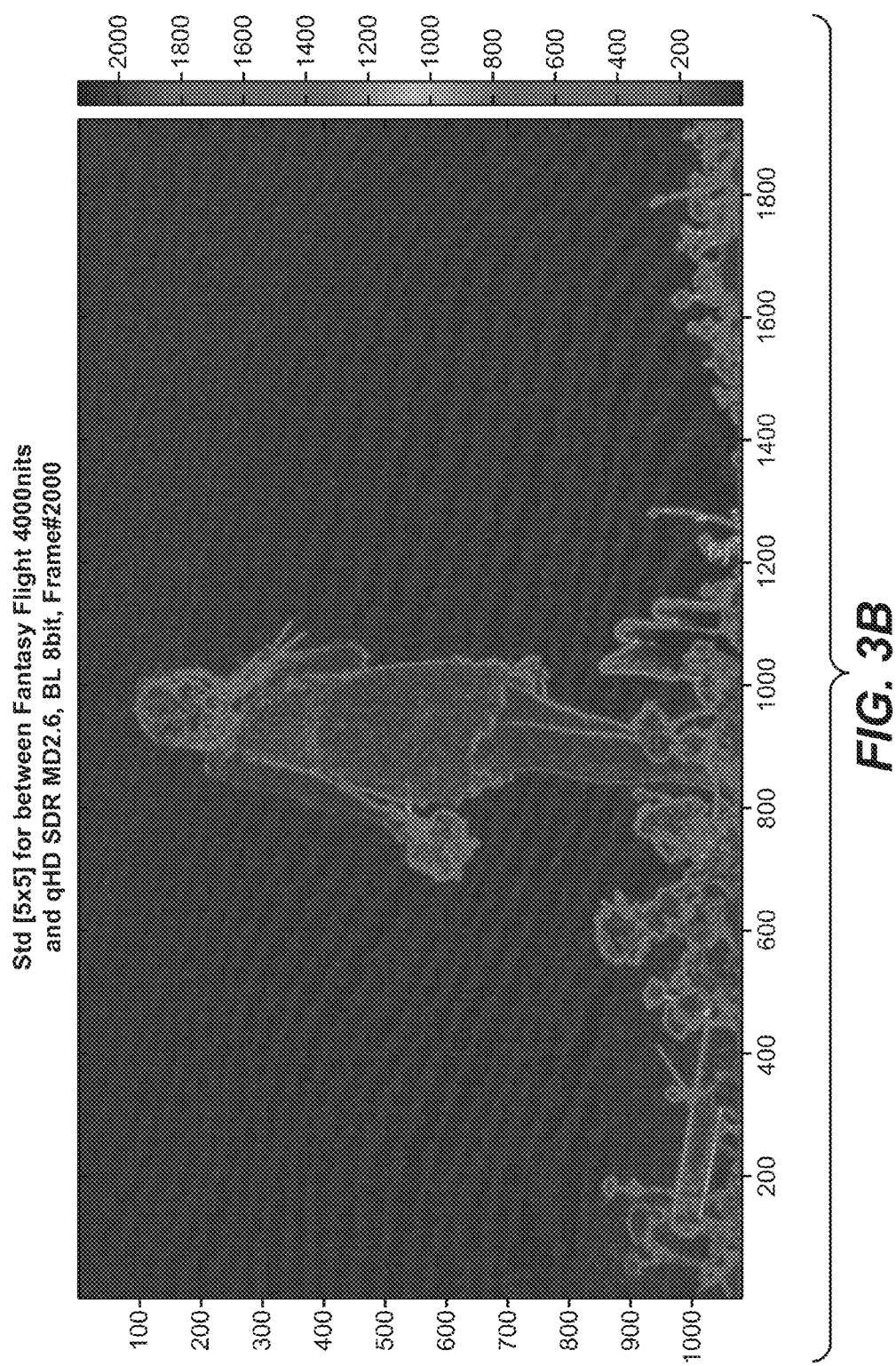

In some embodiments, the contour map operation (110) is configured to detect contouring areas. A residual image between the original VDR image and the predicted VDR image (e.g., without applying decontouring filtering with sparse FIR filter, etc.), as illustrated in FIG. 3A, may be computed. Standard deviations, as illustrated in FIG. 3B, for measuring the smoothness (e.g., in terms of luminance channel code words or pixel values, etc.) around individual pixels in the residual image may be computed with the following expressions:

$$\mu_i = \frac{1}{W_\sigma^2} \sum_{j \in n_i} r_j \qquad (2)$$

$$\sigma_i = \sqrt{\frac{1}{W_\sigma^2} \sum_{j \in n_i} (r_j - \mu_i)^2} \qquad (3)$$

where $n_i$ is the pixel block of $W_\sigma \times W_\sigma$ centering at pixel i, and $r_j$ is the residual value of pixel j in pixel block $n_i$.

The many-to-one mappings between a VDR image and an SDR image may be represented by a quantization parameter (or a quantization interval range) given in the following expression:

$$m = \frac{2^{VDR\_bitdepth}}{2^{BL\_bitdepth}} \qquad (4)$$

The standard deviations a, as computed in expression (3) may be normalized with the following expression:

$$\bar{\sigma}_i = \frac{\sigma_i}{m} \qquad (5)$$

In some embodiments, a 1D or 2D median filter may be used to remove noises (e.g., spikes, etc.) that might exist in the standard deviations, as shown in the following expression:

$$\tilde{\sigma}_i = \text{medianfilter}(\bar{\sigma}_i) \quad (6)$$

Figure 3C:
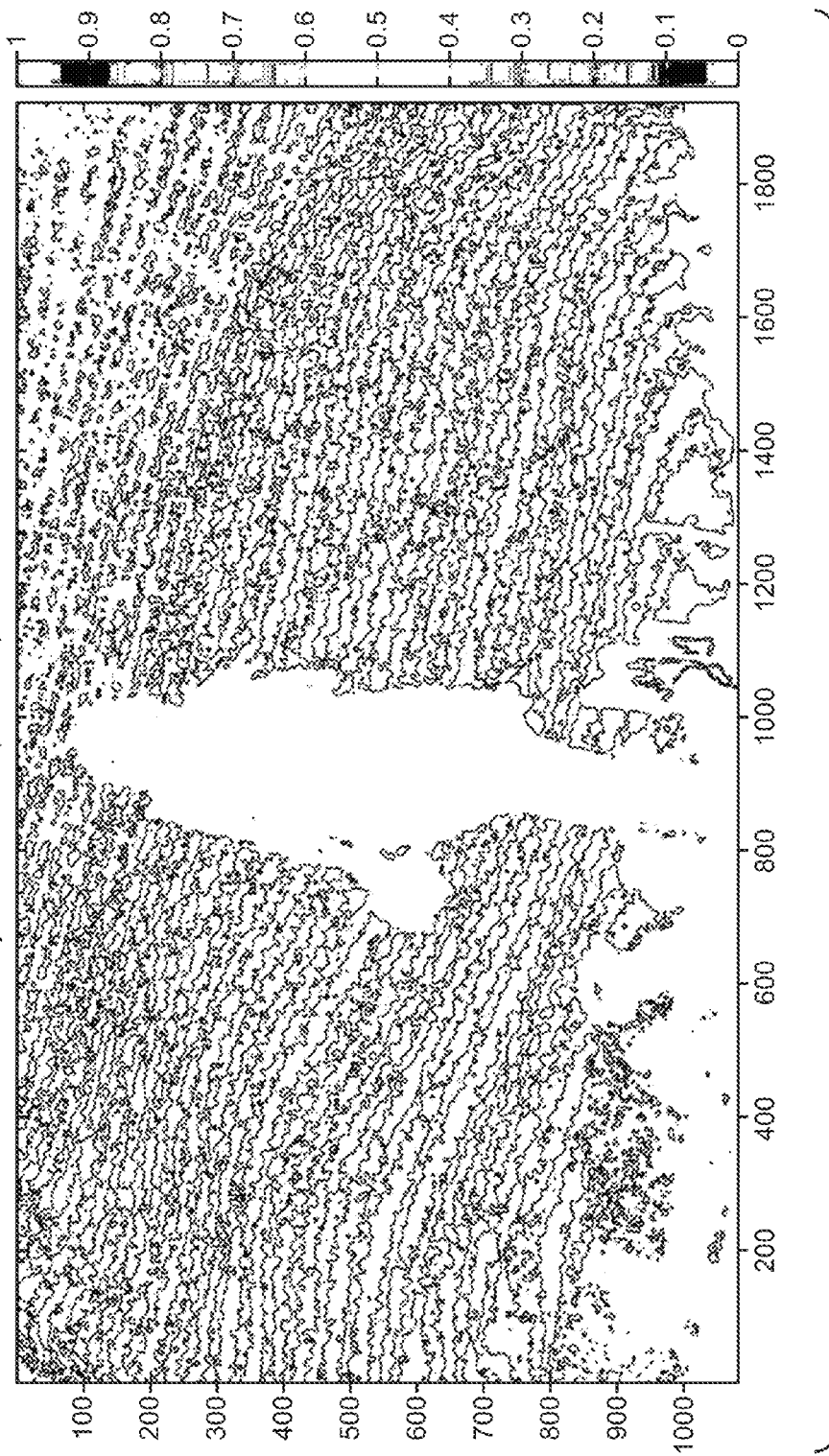

False contouring artifacts exist in areas where pixels' $\tilde{\sigma}_i$ is small. However, a very small value of $\tilde{\sigma}_i$ may indicate an area around pixel i in the original VDR image is already very smooth (e.g., in terms of luminance channel code words or pixel values, etc.). In some embodiments, a pixel-level control map of false contour filtering, as illustrated in FIG. 3C, may be initially defined with pixel-level Boolean values $\alpha_i$ (e.g., a pixel i is inside a false contouring area if and only if $\alpha_i$ is 1, etc.) in the following expression:

$$\alpha_i (\tilde{\sigma}_i < T_H) \cdot (\tilde{\sigma}_i > T_L) \quad (7)$$

where $T_H$ is an upper threshold, and $T_L$ is a lower threshold. If a pixel's value is below $T_H$, the pixel is considered to be in an area to which decontouring operations should apply unless the pixel's value is also below $T_L$, which indicates that the pixel may be in an area of original smoothness (e.g., in terms of luminance channel code words or pixel values, etc.) in the original VDR image.

In some embodiments, $T_H$ may be one of ¾, ½, ⅓, ¼, etc. In some embodiments, $T_L$ may be a value smaller than $T_H$ such as 0.2, 0.1, 0.05, near zero, etc. Thresholds $T_L$ and $T_H$ may be set manually, preconfigured, or image dependent (e.g., as determined based on image content analysis, etc.).

Figure 3D:
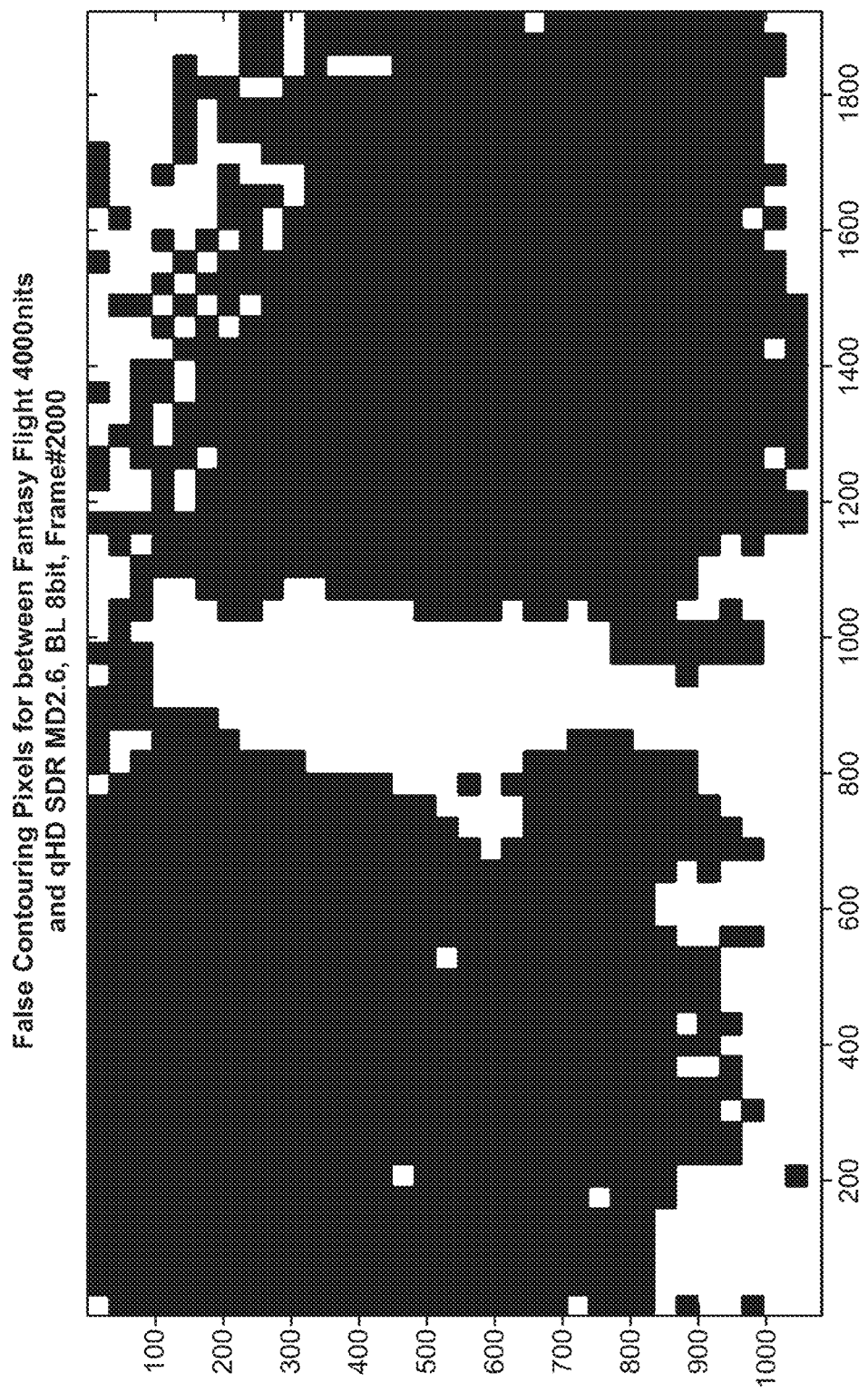

In some embodiments, the VDR image is partitioned into multiple non-overlapping (e.g., contiguous, etc.) blocks $B_j$, with dimension $W_B \times W_B$. A measure $b_j$ of frequency of contouring artifact in a block j may be computed. A measure $c_j$ that indicates how likely a block j is at an edge of original flat areas may also be computed. In some embodiments, a block-level map $\beta_j$ of false contouring (e.g., a block j is inside a false contouring area if and only if $\beta_j$ is true, etc.), as illustrated in FIG. 3D, may be defined with $b_j$ and $c_j$ in the following expressions:

$$b_j = \frac{1}{|B_j|} \sum_{i \in B_j} \alpha_i \quad (8)$$

$$c_j = \frac{1}{|B_j|} \sum_{i \in B_j} (\tilde{\sigma}_i < T_L) \quad (9)$$

$$\beta_j = (b_j > T_B) \cdot (c_j < T_B) \quad (10)$$

where |*| represents the number of elements in the set, and $T_B$ is a threshold related to percentile of pixels having a Boolean value of 1 to be summed up in expressions (8) and (9). Threshold $T_B$ may be set manually, preconfigured, or image dependent (e.g., as determined based on image content analysis, etc.). All $\beta_j$ (e.g., having a Boolean value of 1 in expression (10), etc.) can be collected together to form a pixel-level map F (denoted as $F_{i,j}$, where (i,j) is the coordinate).

A control map of false contour filtering, whether pixel-level, block-level, etc., may not be of a regular shape such as a rectangle, a polygon, etc., and may be in an arbitrary shape depending on the image from which the control map of false contour filtering is derived. Decontouring filtering based on a sparse FIR filter as described herein may be turned on in areas (e.g., standard deviation values at or below an upper threshold that indicates complex image portions but above a lower threshold that indicates original smoothness in the original VDR image, etc.) where false contouring likely exists according to the control map of false contour filtering, and may be turned off in other areas (e.g., high standard deviation values indicating complex image portions, near-zero standard deviation values indicating original smoothness in the original VDR image, etc.) where false contouring unlikely exists according to the control map of false contour filtering. In some embodiments, the sparse FIR filter used for processing a VDR image may be set with different filter parameter values block by block in the same VDR image. In some embodiments, the sparse FIR filter used for processing a VDR image may be set with an image-wide filter parameter values that apply to all blocks in the same VDR image. In some embodiments, the sparse FIR filter used for processing a group of VDR images may be set with a group-wide filter parameter values that apply to all blocks in all VDR image in the same group (e.g., a few frames, a scene, a portion of a scene, etc.). In some embodiments, one or more different ways of setting filter parameters may be adaptively used depending on available bit rates, available processing power of VDR codecs, available memory spaces, available memory I/Os, etc.

For the purpose of illustration only, TABLE 2 shows an algorithm that calculates or sets, for an input area A (e.g., entirety, portion, block, etc.) of an image (e.g., a predicted image, a SDR image tone-mapped from the original VDR image, etc.), area-wide filter parameters such as an image-wide horizontal stair step size, an image-wide vertical stair step size, etc. The image-wide filter parameters may be used by a sparse FIR filter that performs decontouring operation on the predicted image.

TABLE 2

```
// input: area A
// output: ave_step : the average stair step size for area A
hist_cnt[MAX_HIST] = 0;
// repeat the following "for" loop for each considered direction of
// horizontal and vertical directions of area A
for each line j (e.g., a row or a column of area A along the considered direction) in
  area A
{
  // perform median filtering for each pixel of a line A_j of code words or
  // pixel values with a preconfigured or configurable number of neighbors
  // to produce a line M_j of median filtered code words or pixel values
  M_j = median filter (A_j , Num_Neighbor );
  // calculate the total number of pixels in line j
  N_j = number of pixels in M_j.
  // find the differential value for each neighbor pair
  // find control map of false contour filtering
  for( i = 0; i < N_j – 1; i++ ){
    D_i = M_{j, i+1} – M_{j,i} ;
```

TABLE 2-continued

```
    F_i = F_{j, i} ;
  }
// initial condition
seg_start = 0;
cnt = 0;
search_flag = 1;
// search through median filtered code words or pixel values in line j
//    for any change along the considered direction
// *note* a change in the code words or pixel values at a pixel indicates
//    (1) the beginning of a same valued pixel segment
//    at the pixel along the considered direction, and
//    (2) if there is another pixel before the pixel,
//    the other pixel is the end of a previous same
//    valued pixel segment
// keep counts of (contiguous) code words or pixel values in same valued
//    segments and populate a histogram for the considered
//    direction with the counts
while( search_flag ) {
  // sum the difference along a segment
  seg_sum = 0;
  map_sum = 0;
  for( i = seg_start; i <= seg_start + cnt; i++ ){
    seg_sum += D_i;
    map_sum += ( 1 - F_i) ;
  }
  If( (seg_sum == 0 )&&( map_sum == 0){
    // median filtered code word or pixel value up to the pixel at
    // seg_start + cnt for the current segment is constant, keep
    // counting by moving to the next pixel (cnt increment by one)
    cnt ++;
  }
  else{
    // median filtered code word or pixel value for the pixel at
    // seg_start + cnt changes, add to histogram for a segment length of
    // cnt position the next segment to a pixel at seg_start given below
    // reset cnt for next segment of constant media filtered code word or
    // pixel value
    hist_cnt[ cnt] ++;
    if( cnt == 0 ){
      seg_start ++;
    }
    else{
      seg_start += cnt;
    }
    cnt = 0;
  }
  // end of line, stop
  if( seg_stat + cnt >= N_j ){
    search_flag = 0;
  }
 }
}
// calculate an average stair step size for the considered direction in area A
// by averaging all the stair step sizes for bins of the histogram representing
// segments with numbers of consecutive pixels having a same code word
// or pixel value above MIN_PIXEL_NUMBER (e.g., 10, etc.). In other
// words, false contouring may not be perceptible for a segment with a number
// of consecutive constant median filtered code word or pixel value below
// MIN_PIXEL_SIZE
ave_step = 0;
all_cnt = 0;
for( i = MIN_PIXEL_SIZE; i < MAX_HIST-1; i ++ )
  all_cnt += hist_cnt(i);
  ave_step += hist_cnt(i) * i;
}
ave_step = ave_step / all_cnt;
return ave_step;
```

In some embodiments, the sparse-FIR-filter-parameters operation (116) is configured to implement the algorithm in TABLE 2 to calculate the stair step sizes based on a (e.g., block-level, pixel-level, etc.) control map of false contour filtering and an input image. In some embodiments, the algorithm in TABLE 2 may be carried out on a predicted image. In some other embodiments, the algorithm in TABLE 2 may be carried out on a SDR image instead of a predicted image. A span (e.g., the number of pixels having a certain code word or pixel value, etc.) in the SDR image may be mapped straightforwardly to a corresponding span in a corresponding predicted image.

As shown in TABLE 2, for each line (e.g., row, column, etc.) of an input area A along a considered direction (e.g., horizontal, vertical, etc.), segments each of which has a number of consecutive pixels (e.g., 1 pixel, two pixels, etc.) having a same code word or pixel value (e.g., median-filtered pixel value, a luminance value, a color channel value, etc.) are determined from pixels or pixel blocks in an arbitrary shape of false contouring. The arbitrary shape for false contour filtering may be represented with Boolean values in a control map of false contour filtering as generated in the contour map operation (110).

In some embodiments, the sparse-FIR-filter-parameters operation (116) is configured to use numbers of same-valued pixels in the segments to build a histogram for the input area A in the considered direction. Each bin of the histogram comprises a count or a stair step size for a specific corresponding number of consecutive pixels (e.g., 1 pixel, two pixels, etc.) having a same pixel value (e.g., same code word, etc.).

In some embodiments, the sparse-FIR-filter-parameters operation (116) is configured to compute an average count among counts of all bins of the histogram except for counts of bins whose numbers of consecutive pixels (e.g., 1 pixel, two pixels, etc.) having a same pixel value are below a threshold such as MIN_PIXEL_SIZE, etc. A stair step size (e.g., $L_H$ when the considered direction is horizontal, $L_V$ when the considered direction is vertical, etc.) to be used in a sparse FIR filter t filter pixel values along the considered direction may be set in relation to (e.g., equal to, proportional to, etc.) the average count as determined from the histogram. The span (e.g., s(u)–s(–u) in expression (1), etc.) of the sparse FIR filter to be used to filter pixel values along the considered direction may be set to the stair step size (e.g., $L_H$ when the considered direction is horizontal, $L_V$ when the considered direction is vertical, etc.).

In some embodiments, instead of using a histogram, a maximum and minimum code values (or pixel values) may be determined for a segment (e.g., a line, a part of a line, etc.) of pixels. A stair step size can be determined based on a relationship (e.g., proportional relationship, identity relationship, etc.) with the length (e.g., how many pixels, etc.) of the segment divided by the difference between the maximum and minimum code values. This method of determining the stair step size may be used when code values are likely to be monotonically increasing or monotonically decreasing in the segment of pixels.

The detected false contouring areas (e.g., as represented by the control map of false contour filtering in FIG. 3D, etc.), may not be directly used for the decontouring filtering purpose, as the sparse FIR filter may need a large support area (e.g., less than 100 pixels, larger than or equals to 100 pixels, etc.) that extends over pixels that are not in the detected false contouring areas. However, the pixels not in the detected false contouring areas may be of a high spatial frequency texture that exists in the original VDR image. Including such pixels in decontouring filtering may cause blurring a reconstructed VDR image with pixels of different textures in the original VDR image.

Figure 3E:
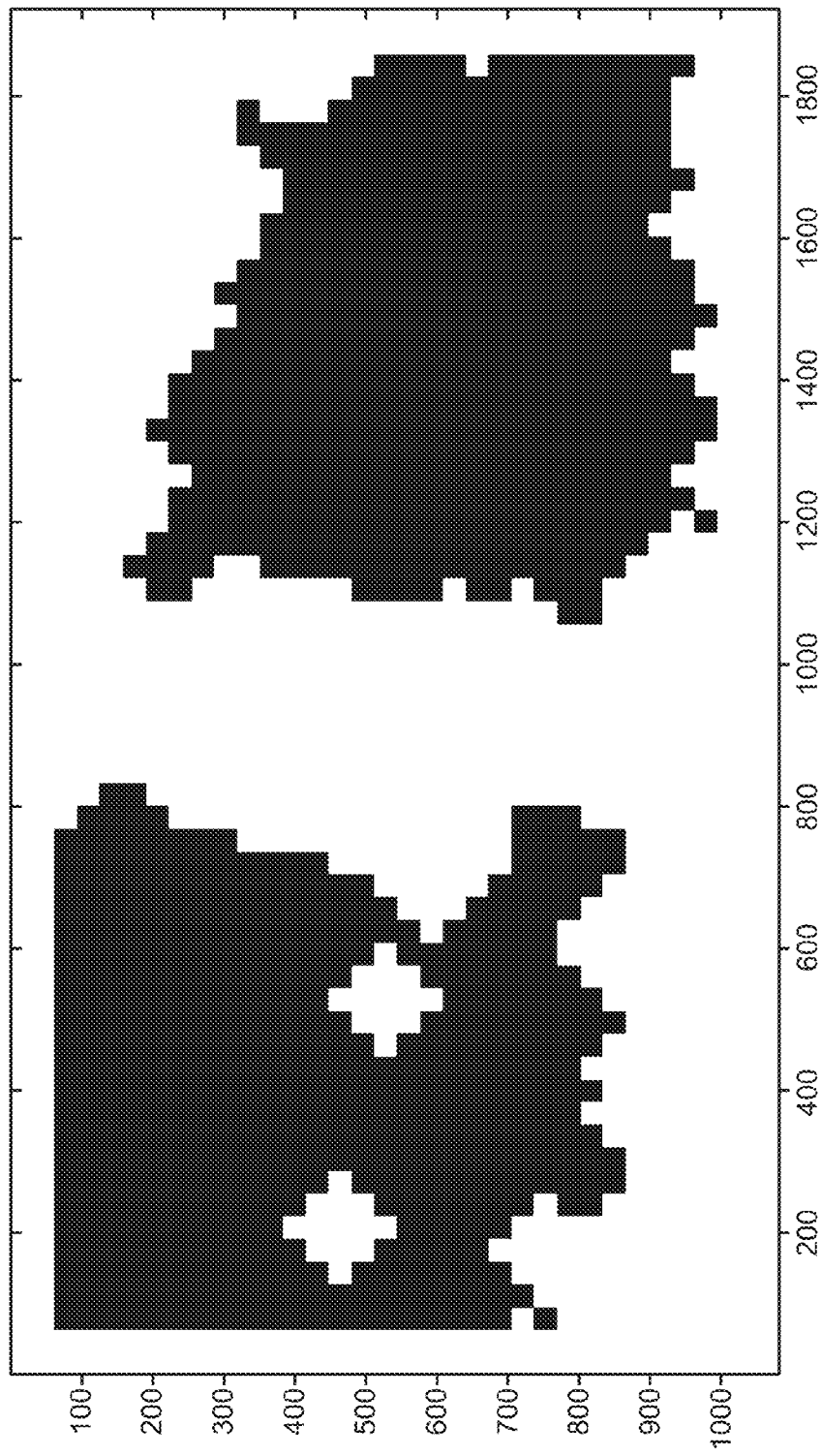

In some embodiments, a shrunk map $\Omega$ of false contouring, as illustrated in FIG. 3E, is constructed in the contour map border operation (124) by shrinking the false contouring areas in FIG. 3D along the borders of the false contouring areas by half of the stair step size (e.g., from each of the horizontal and vertical directions, etc.). As a result, all the pixels in FIG. 3E to be filtered by the sparse FIR filter have their respective support pixels all in the (unshrunked) control map of false contour filtering in FIG. 3D.

In some embodiments, the stair steps size (e.g., 99 pixels, etc.) of a sparse FIR filter for decontouring filtering may be larger than a block length (e.g., $W_B$=2, 3, 4, 5, 6, etc.) of blocks that form a block-level control map of false contour filtering as illustrated in FIG. 3D. A simple solution may be to check how many blocks with the block length $W_B$ is sufficient to cover one half of the stair step size (e.g., $L_H$ when the considered direction is horizontal, $L_V$ when the considered direction is vertical, etc.). More specifically, the control map of false contour filtering as illustrated in FIG. 3D may be shrunk into false contouring areas from the border of the false contouring areas by ceiling ($L_H/(2W_B)$) blocks horizontally, and ceiling ($L_V/(2W_B)$) blocks vertically, to derive the shrunk map $\Omega$ of false contouring, as illustrated in FIG. 3E.

In some embodiments, the contour map encoding operation (134) is configured to encode the shrunk map $\Omega$ of false contouring. For example, since $\Omega$ is a binary map, and since there are many consecutive same values (0 or 1), to reduce the bit rate needed to transmit the map $\Omega$, a simple run-length coding can be applied, for example, to get a (e.g., 0.5, etc.) decent compression ratio. Other encoding methods (e.g., quad-tree encoding, etc.) may also be used to encode the map $\Omega$ for transmission.

In some embodiments, the sparse FIR filtering operation (132) is configured to perform decontouring filtering with the sparse FIR filter on false contouring areas as represented by the map $\Omega$, in the predicted VDR image generated by the inverse mapping (122). More specifically, the decontouring filtering may be applied to the pixels within the false contouring areas as represented by the map $\Omega$. An example algorithm for decontouring filtering is shown in the following table:

TABLE 3

```
// For vertical direction
// L is the number of filter taps, which may have a default
// value such as 3, 5, 7, etc.
For each (m, n)
    if (m, n) ∈ Ω
```

$$x^v[m, n] = \frac{1}{L} \sum_{i=-L/2}^{L/2} x[m, n + s^v[i]]$$

```
    end
end
// For horizontal direction
For each (m, n)
    if (m, n) ∈ Ω
```

$$y[m, n] = \frac{1}{L} \sum_{i=-L/2}^{L/2} x^V[m, n + s^h[i]]$$

```
    end
end
```

For the purpose of illustration only, decontouring filtering is performed on a shrunk control map of false contour filtering. In some other embodiments, other ways of handling boundary conditions for decontouring filtering may be used. For example, decontouring filtering may be performed on an unshrunk control map of false contour filtering. Instead of using pixels that are outside false contour areas, pixels outside the false contour areas, which pixels are to be used in decontour filtering, may be populated for the purpose of decontouring filtering with code values or pixel values in the false contour areas, for example, through symmetry extension.

In the subtraction operations (124), the multi-layer encoder (102) is configured to generate residual values between the VDR code words decoded from the source video content (104) and the VDR code words represented in the prediction image data after decontouring filtering.

Residual values in a specific channel (e.g., a luminance channel, a Y channel, etc.) may be differences produced by the subtraction operations (124) in a logarithmic domain or in a linear domain.

In the non-linear quantization operations (126), the multi-layer encoder (102) is configured to quantize the residual values in a first digital representation (e.g., 12+ bit, etc.) to a second digital representation (e.g., 8-bit, etc.) in a color space (e.g., YCbCr, etc.) using one or more NLQ parameters.

In the EL encoding operations (128), the multi-layer encoder (102) is configured to encode the (e.g., 8-bit, etc.) residual values as generated by the non-linear quantization operations, into the EL image data (108) in an (e.g., 8-bit, etc.) EL image container in a (e.g., 4:2:0, etc.) sampling format. The EL image container in the enhancement layer may be logically separate from the BL image container in the base layer, even though both image containers can be concurrently contained in a single digital video signal (e.g., a single coded bitstream, a single media file, a single broadcast, etc.).

In an example embodiment, the multi-layer encoder (102) outputs the EL image data (108) in the EL image containers as a part of multi-layer video signal to a downstream device (e.g., the multi-layer decoder 152 of FIG. 2, etc.).

In an example embodiment, the multi-layer encoder (102) outputs metadata (130) comprising some or all of operational parameters used in the operations of the multi-layer encoder (102) as a part of multi-layer video signal to a downstream device (e.g., the multi-layer decoder 152 of FIG. 2, etc.). The operational parameters in the metadata (130) transmitted to downstream devices include but are not limited to, any of: one or more of map $\Omega$, spans for sparse FIR filters, other sparse FIR filter parameters, mapping parameters, clipping parameters, inverse mapping parameters, LUTs, non-linear quantization parameters, NLQ parameters, etc. The metadata (130) may be a part of data carried in the EL layers and/or the BL layer, or in a separate sub-bitstream of an overall video bitstream, for example, as a part of supplemental enhancement information (SEI) or other similar metadata carriages available in the video bitstream. An example sub-bitstream may be a reference processing unit (RPU) stream developed by Dolby Laboratories, Inc.

For example, the LUTs used in the prediction operation (122) may be transmitted to downstream devices as a part of the metadata (130). In some embodiments, lookup keys and values corresponding to the lookup keys in a LUT are transmitted to downstream devices as a part of the metadata (130). In some embodiments, at least one LUT may be representable by an analytic function or a multi-segment analytic function. Instead of transmitting lookup keys and values corresponding to the lookup keys in the LUT to downstream devices, parameters defining the analytic function are sent to the downstream devices as a part of the metadata (130), in order to reduce the amount of the metadata (130) in transmission. In some embodiments, parameters in a mapping function used to numerically derive a LUT are transmitted to downstream devices as a part of the metadata (130), instead of transmitting lookup keys and values corresponding to the lookup keys in the LUT. A downstream device can use the parameters to derive the LUT as illustrated with expression (1). A video codec specification governing encoding and decoding operations may comprise syntactic elements to pass one or more of parameters as described herein from an upstream device (e.g., the multi-layer encoder 102, etc.) to downstream devices (e.g., the multi-layer decoder 152, etc.).

The EL image data (108), the BL image data (106) and the metadata (130) can be used by the downstream device to generate a decoded version of relatively wide dynamic range (e.g., VDR, HDR, etc.) images that represent the relatively wide dynamic range input images in the source video content (104).

One or more of the operations such as the BL encoding operations (118), the BL decoding operations (120), the EL encoding operations (128), etc., may be implemented using one or more of a plurality of codecs, including, but not limited to, any combination of: H.264/AVC/HEVC, MPEG-2, VP8, VC-1, and/or others.

4. Multi-Layer Video Decoding

A multi-layer video signal (e.g., coded bitstream, etc.) comprising video content can be received by a multi-layer decoder (e.g., 152 of FIG. 2, etc.). In some embodiments, the video content received by the multi-layer decoder (152) comprises BL image data (e.g., 106 of FIG. 1, FIG. 2, etc.) of a relatively low bit depth and EL image data (e.g., 108 of FIG. 1 and FIG. 2, etc.). In some embodiments, both the BL image data (106) and the EL image data (108) were derived/quantized from the relatively high bit depth (e.g., 12+ bit VDR, etc.) source video content (e.g., 104 of FIG. 1, etc.). In some embodiments, the multi-layer decoder (152) is configured to receive metadata (130) comprising some or all of operational parameters used in operations that generate the BL image data (106) and the EL image data (108) as a part of the multi-layer video signal. The operational parameters in the metadata (130) include but are not limited to, any of: one or more of map $\Omega$, spans for sparse FIR filters, other sparse FIR filter parameters, mapping parameters, clipping parameters, inverse mapping parameters, LUTs, non-linear quantization parameters, NLQ parameters, etc. The metadata (130) may be a part of data carried in the EL layers and/or the BL layer, or in a separate sub-bitstream of an overall video bitstream, for example, as a part of supplemental enhancement information (SEI) or other similar metadata carriages available in the video bitstream. An example sub-bitstream may be a reference processing unit (RPU) stream developed by Dolby Laboratories, Inc.

In some embodiments, the BL image data (106) is placed in a base layer container (e.g., an 8-bit YCbCr 4:2:0 container, etc.). In some embodiments, the EL image data (108) comprises residual image data of the (e.g., VDR, etc.) source video content (104) relative to predicted image data generated from the BL image data (106). In some embodiments, the EL image data (108) is placed in one or more enhancement layer containers (e.g., one or more 8-bit residual data containers, etc.).

In an example embodiment, the multi-layer decoder (152) is configured to perform decoding operations on the BL image data (106) and the EL image data (108) to generate one or more wide dynamic range (e.g., VDR, etc.) images that represents a reconstructed version (e.g., reconstructed BL+EL video content 166, etc.) of source images in source video content that was used to generate the multi-layer video signal. The decoding operations include but are not limited to one or more of: BL decoding operation (160), inverse mapping operations (162), EL decoding operations (154), non-linear de-quantization operations (156), contour map decoding operation (168), sparse FIR filtering operation (170), addition operations (158), etc.

In the BL decoding operations (160), the multi-layer decoder (152) is configured to decode the (e.g., 8 bit, etc.) BL image data (106) in the (e.g., 8-bit, etc.) BL image containers into mapped code words in one or more mapped images (e.g., tone-mapped images).

In the inverse mapping operations (162), the multi-layer decoder (152) is configured to inversely map—for example, based on one or more lookup tables (LUTs) decoded from the metadata (130)—the mapped code words into VDR code words. In some embodiments, the multi-layer decoder (152) is configured to directly receive the LUTs in the metadata (130) in terms of lookup keys and values corresponding to the lookup keys. In some embodiments, the multi-layer decoder (152) is configured to receive parameter values related to one or more functions and to use the parameter values and the one or more functions to generate (e.g., numerically, etc.) the one or more LUTs (e.g., lookup keys and values corresponding to the lookup keys, etc.) to apply in the inverse mapping operations (162).

In the EL decoding operations (154), the multi-layer encoder (152) is configured to generate (e.g., 8-bit, etc.) residual values by decoding the EL image data (108), which may be in an (e.g., 8-bit, etc.) EL image container in a (e.g., 4:2:0, etc.) sampling format.

In the non-linear de-quantization operations (156), the multi-layer decoder (152) is configured to de-quantize the residual values in a relatively low bit depth digital representation (e.g., 8-bit, etc.) as decoded to a relatively high bit depth digital representation (e.g., 12+ bit, etc.) in a (e.g., YCbCr, etc.) color space using one or more NLQ parameters decoded from the metadata (130).

In some embodiments, the multi-layer decoder (152) is configured to implement BL-to-EL prediction (e.g., intra and/or inter prediction, etc.) in order to reduce the amount of EL image data that needs to be carried in the EL layers for reconstructing VDR images by the multi-layer decoder (152). The multi-layer decoder (152) can generate, based at least in part on the VDR code words obtained through the prediction operation (122), prediction image data that comprise the VDR code words to be used in the sparse FIR filtering operations (170).

In some embodiments, the contour map decoding operation (168) is configured to decode a shrunk map $\Omega$ of false contouring from the metadata (130). In some embodiments, the sparse FIR filtering operation (170) is configured to decode filter parameters for a sparse FIR filter and perform decontouring filtering, with the sparse FIR filter on false contouring areas as represented by the map $\Omega$, in the predicted VDR image generated by the inverse mapping (122). More specifically, the decontouring filtering may be applied to the pixels within the false contouring areas as represented by the map $\Omega$. An example algorithm for decontouring filtering is shown in TABLE 3.

In the addition operations (158), the multi-layer decoder (152) is configured to generate the reconstructed version of one or more wide dynamic range images based on the residual values generated in the EL decoding operations (154) and the VDR code words generated in the inverse mapping operations (162) after the decontouring operation performed by the sparse FIR filtering operation (170). The reconstructed version of the one or more wide dynamic range images can be outputted to and/or rendered on a display panel, for example, by a (e.g., HDR, VDR, etc.) display system that operates with or includes the multi-layer decoder (152).

In some embodiments, components or modules used in the inverse mapping (162) or the BL decoding operations (160) of the multi-layer decoder (152) may be the same or substantially the same as those used in the inverse mapping (120) or the BL decoding operations (118) of the multi-layer encoder (102).

One or more of the operations performed by the multi-layer decoder (152) may be implemented using one or more of a plurality of codecs, including, but not limited to, any combination of: H.264/AVC/HEVC, MPEG-2, VP8, VC-1, and/or others.

Figure 3F:
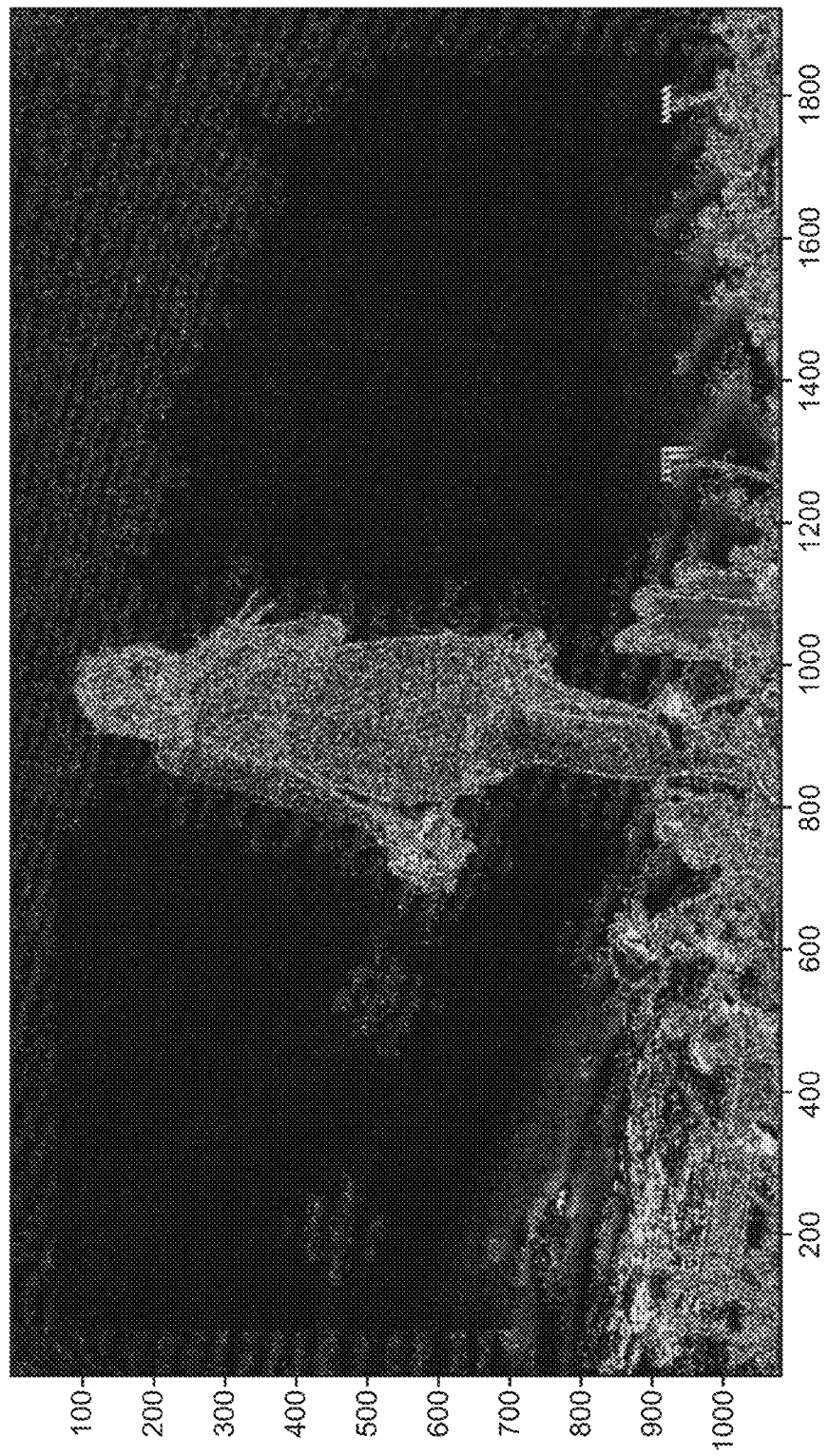
Figure 3G:
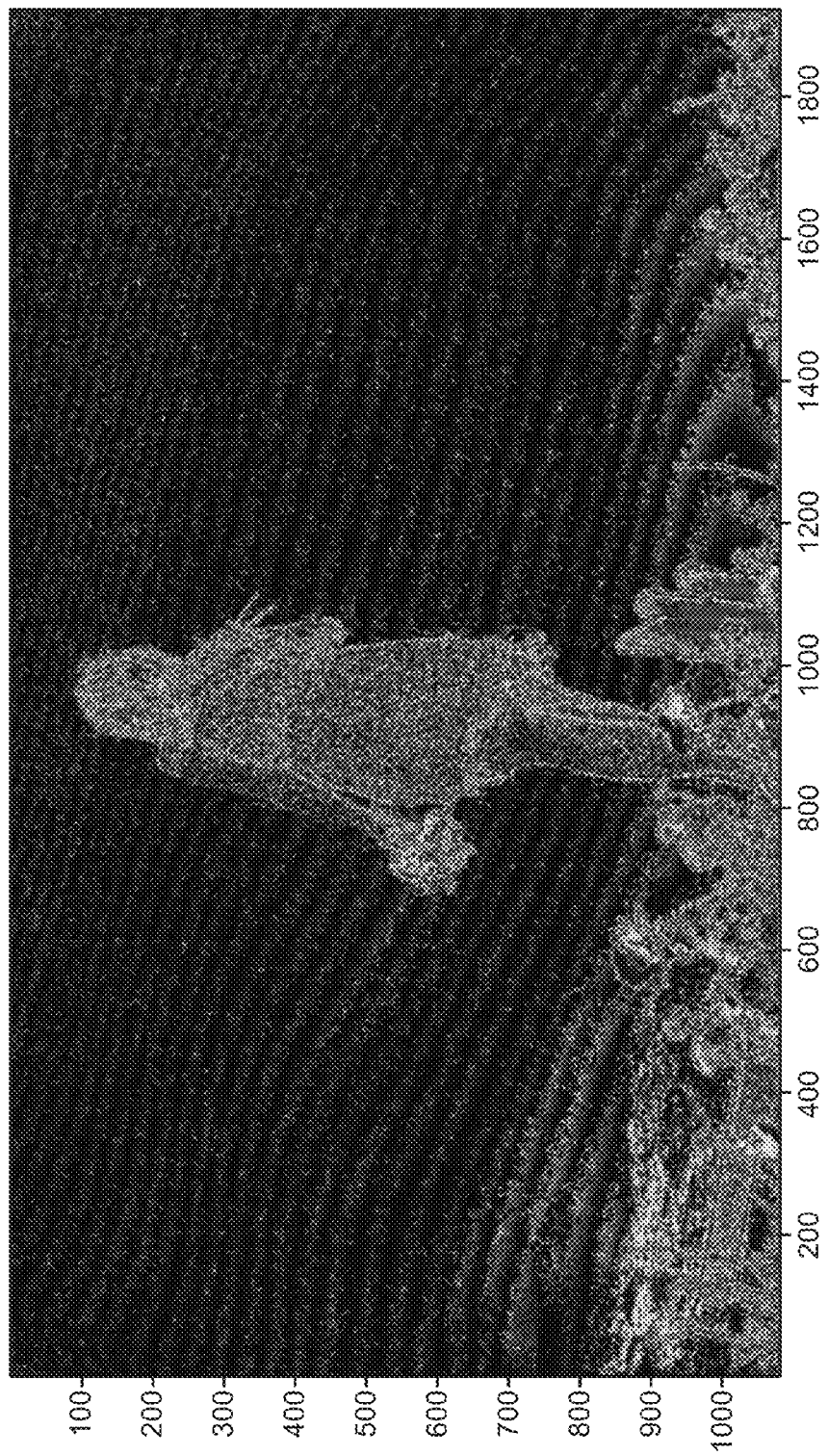

FIG. 3F and FIG. 3G illustrate example residual images that show the effectiveness of example decontouring filtering under techniques as described herein. The residual image of FIG. 3F (in the filtered area: PSNR=60.0677 dB) represents residuals between an original VDR image (e.g., in the source video content 104, etc.) and the filtered output image generated by sparse FIR filtering operation (e.g., 132, 170, etc.). The residual image of FIG. 3G (in the area corresponding to the filtered area in FIG. 3F: PSNR=59.5499 dB) represents residuals between an original VDR image (e.g., in the source video content 104, etc.) and the unfiltered output image generated by a prediction operation (e.g., in inverse operations 122, 162, etc.). As illustrated, the false contouring in the sky portion as indicated by the control map of FIG. 3C is significantly reduced owing to the sparse FIR filtering.

In some example embodiments, different decontouring filters in different color spaces and/or in different color channels may be selected. For example, to alleviate/reduce/remove contouring artifacts (e.g., in smooth areas, etc.) and other artifacts, video signals may be filtered in different color spaces and/or with different decontouring filtering methods. Sparse FIR filter parameters may be selected on the basis of any of: a frame, multiple frames, a scene, multiple scenes, etc. Sparse FIR filtering and/or quantization may be performed on an individual channel basis or on two or more channels at the same time.

In some embodiments, a specific decontouring filtering method may be selected based on how well it can alleviate/reduce/remove contouring artifacts in output multi-layer VDR image data while still maintaining high performance and low computational costs on the VDR decoder side.

A multi-layer encoder under techniques as described herein may take input VDR image data as the only input for image content to be processed by the multi-layer encoder. While the input VDR image data may be provided to enhancement layer data processing, decontouring filtering, which may be performed on-the-fly (e.g., at the same wire speed at which the input VDR is inputted into the VDR encoder, etc.), may be used to generate input image data to base layer data processing as described herein.

Decontouring filtering as described herein may be performed in one or more different ways. Filtering may be performed globally in which an entire frame or an entire scene is filtered using a single setting (e.g., filter parameters, etc.). Filtering may also be performed on the basis of partition in which each frame is partitioned into a plurality of non-overlapping regions (e.g., areas, etc.) and each non-overlapping region is filtered using its own setting. Filter parameters for a specific non-overlapping region, a specific frame, a specific scene, etc., may be determined based on image content analysis data derived from the specific non-overlapping region, the specific frame, the specific scene, etc. Filtering as described herein may be applied with any of one or more different color spaces used to represent pixel values of images. Examples of color spaces in which filtering as described herein may be applied include, but are not only limited to, any of: RGB color spaces, YCbCr color spaces, YCoCg color spaces, ACES color spaces, or other color spaces.

In some embodiments, a color space in which filtering is applied is kept the same as a color space in which prediction is performed. This may be so in both VDR image encoding process and VDR image decoding process. Color space transformation may also be performed as appropriate if a color space in which image rendering occurs is different from a color space in which filtering occurs.

5. Example Implementations

In an example implementation, the following steps may be performed by a multi-layer VDR video encoder (e.g., 102 of FIG. 1).

STEP 1 is an algorithm for detection of contouring areas (DCA) and comprises the following sub-steps:

(1) The residual between an original VDR signal (e.g., source video content 104, etc.) and a predicted VDR signal (e.g., generated in the inverse mapping 122, etc.) is calculated and obtain a standard deviation for each pixel in the residual.

(2) A 2D median filter is used on the standard deviation to remove noise.

(3) Then, a high (to detect false contouring) threshold and a low threshold (to remove pure flat area) are applied to compute indicators at the pixel level, each indicator at the pixel level indicating whether a pixel is located in a smooth or complex area.

(4) Having the indicators at the pixel level, indicators are computed for pixel blocks. An indicator at the block level is determined based on whether there are a sufficient number of smooth pixels in a pixel block with dimension $W_B \times W_B$. If yes, this block is marked as potential false contouring areas.

(5) A decontouring map is constructed based on the block-level indicators. An example is shown in FIG. 3D.

STEP 2 is an algorithm for calculating stair step size with false contouring map (CSSS) and comprises the following sub-steps:

(1) For each horizontal and vertical direction:

(a) The number of consecutive pixels having same value AND within the decontouring map from STEP 1 is counted.

(b) A histogram is built based on the results of counting.

(c) The average for bins (in the histogram) whose counts are larger than a threshold (to reduce the influence for values in lower value bins) is taken. The average value is set as the stair step size (L).

(2) The stair step sizes ($L^h$ and $L^v$) for sparse filtering in both horizontal and vertical directions are obtained. The spans ($s^h[u]-s^h[-u]=L^h$) and ($s^v[u]-s^v[-u]=L^v$) are set based on the stair step sizes.

STEP 3 is an algorithm for shrinking contouring area (SCA) and comprises the following sub-steps:

(1) Since the span of a sparse filter, L, is large, the required support area may exceed the false contouring area, the decontouring map from STEP 1 may be shrunk from the border by at least L/2 pixels (from STEP 2).

(2) A check is performed relative to each pixel block to determine whether that pixel block satisfies the condition that all its horizontal blocks are within radius ceil($L/2W_B$) and all its vertical blocks are within radius ceil($L/2W_B$) in the original decontouring map of FIG. 3D. If yes, mark this block in the shrink decontouring map Q. An example is shown in FIG. 3E.

STEP 4 is an algorithm for encoding the contouring areas (ECD) and comprises the following sub-step: the decontouring map 0 is compressed to reduce bit rate. As it is a binary map, there are a large number of consecutive same values. A simple run-length coding (or quad-tree encoding, etc.) can be applied to get a relatively high (e.g., 0.5, etc.) compression ratio.

STEP 5 is an algorithm for map guided sparse FIR filtering (MGSF) and comprises the following step: the contouring area is filtered using sparse FIR filtering based on the decontouring map as shown in TABLE 3.

In an example implementation, the following steps may be performed by a multi-layer VDR video decoder (e.g., 152 of FIG. 1). Metadata such as (1) $s^h[1]$, $s^h[2]$, $s^v[1]$, and $s^v[2]$, (2) compressed decontouring map $\Omega$, etc., may be provided in one or more metadata portions of an input multi-layer VDR signal to the decoder (152).

STEP 1 is an algorithm for decoding the contouring areas (DCD) and comprises the following step: the compressed decontouring map extracted from the input multi-layer VDR signal is decompressed.

STEP 2 is an algorithm for map guided sparse FIR filtering (MGSF) and comprises the following step: the contouring area is filtered using sparse FIR filtering based on the decontouring map (this is the same as STEP 5 in the encoder side, to avoid any drifting issue).

6. Example Process Flows

Figure 4A:
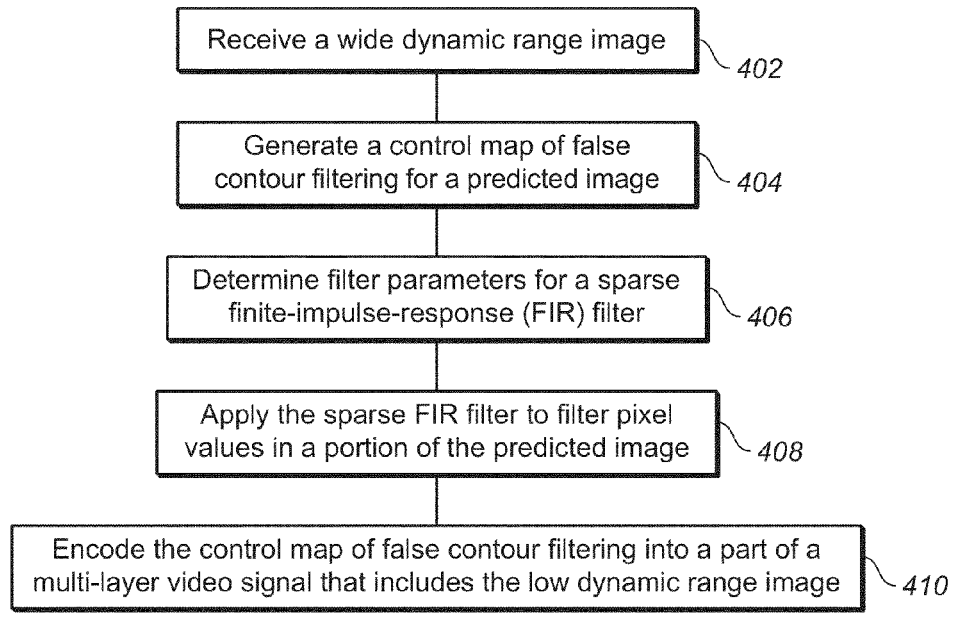
FIG. 4A and FIG. 4B illustrate example process flows.

FIG. 4A illustrates an example process flow according to an example embodiment of the present invention. In some example embodiments, one or more computing devices or components may perform this process flow. In block 402, a multi-layer VDR video encoder (e.g., 102 of FIG. 1) receives a wide dynamic range image.

In block 404, the VDR video encoder generates a control map of false contour filtering for a predicted image. The predicted image may be predicted from a low dynamic range image mapped from the wide dynamic range image.

In block 406, the VDR video encoder determines, based at least in part on the control map of false contour filtering and the predicted image, one or more filter parameters for a sparse finite-impulse-response (FIR) filter.

In block 408, the VDR video encoder applies the sparse FIR filter to filter pixel values in a portion of the predicted image based at least in part on the control map of false contour filtering.

In block 410, the VDR video encoder encodes the control map of false contour filtering into a part of a multi-layer video signal that includes the low dynamic range image.

In an embodiment, the VDR video encoder is further configured to encode the one or more filter parameters for the sparse FIR filter as a part of the multi-layer video signal that includes the low dynamic range image.

In an embodiment, the wide dynamic range image is in a plurality of wide dynamic range images that form a scene; image data derived from the plurality of wide dynamic range images is encoded in the multi-layer video signal.

In an embodiment, the low dynamic range image is encoded as a part of base-layer (BL) image data in the multi-layer video signal.

In an embodiment, the VDR video encoder is further configured to perform: generating residual values based at least in part on the prediction image as filtered by the sparse FIR filter and the wide dynamic range image; applying non-linear quantization to the residual values to generate enhancement layer (EL) image data; and encoding the EL image data into the multi-layer video signal.

In an embodiment, one of the one or more filter parameters represents a number of taps in the sparse FIR filter; the number of taps is constrained to be no more than a fixed number.

In an embodiment, the control map of false contour filtering is a block-level control map derived from a pixel-level control map of false contour filtering. In an embodiment, the control map of false contour filtering is a shrunk control map of false contour filtering derived from an unshrunk control map of false contour filtering.

In an embodiment, weights of two or more taps in the sparse FIR filter are of a same value. In an embodiment, two or more pixel intervals between two or more pairs of adjacent taps in the sparse FIR filter are of a same value.

In an embodiment, a second different sparse FIR filter is used to filter a second different portion of the predicted image. In an embodiment, the sparse FIR filter is used to filter an entire area of the predicted image.

In an embodiment, the sparse FIR filter is used to filter pixel values for a specific channel in a plurality of channels of a color space. In an embodiment, the plurality of channels comprises one or more of a luminance channel, a chroma channel, a red color channel, a blue color channel, a green color channel, or other primary channels.

In an embodiment, base layer (BL) image data derived from wide dynamic range images is compressed by a first 8 bit encoder into the multi-layer video signal; enhancement layer (EL) image data derived from the wide dynamic range images is compressed by a second 8 bit encoder in the multi-layer encoder into the multi-layer video signal.

Figure 4B:
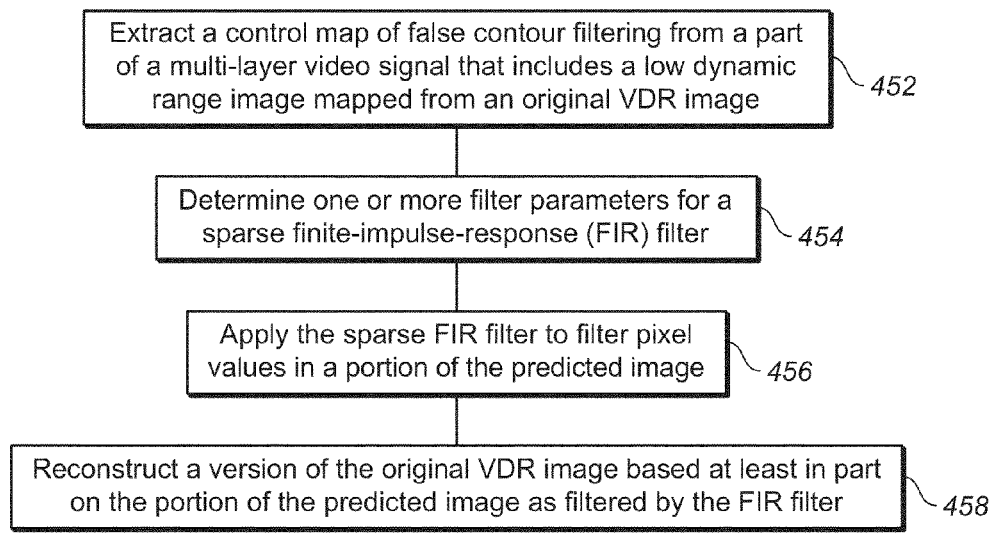

FIG. 4B illustrates an example process flow according to an example embodiment of the present invention. In some example embodiments, one or more computing devices or components may perform this process flow. In block 452, a multi-layer VDR video decoder (e.g., 152 of FIG. 1) extracts a control map of false contour filtering from a part of a multi-layer video signal that includes a low dynamic range image mapped from an original VDR image.

In block 454, the VDR video decoder determines one or more filter parameters for a sparse finite-impulse-response (FIR) filter, the one or more filter parameters relating to at least in part on the control map of false contour filtering and a predicted image predicted from the low dynamic range image.

In block 456, the VDR video decoder applies the sparse FIR filter to filter pixel values in a portion of the predicted image based at least in part on the control map of false contour filtering.

In block 456, the VDR video decoder reconstructs a version of the original VDR image based at least in part on the portion of the predicted image as filtered by the FIR filter.

In an embodiment, the VDR video decoder is further configured to extract the one or more filter parameters for the sparse FIR filter from a part of the multi-layer video signal that includes the low dynamic range image.

In various example embodiments, an encoder, a decoder, a system, an apparatus, or one or more other computing devices performs any or a part of the foregoing methods as described.

Note that, although separate embodiments are discussed herein, any combination of embodiments and/or partial embodiments discussed herein may be combined to form further embodiments.

7. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
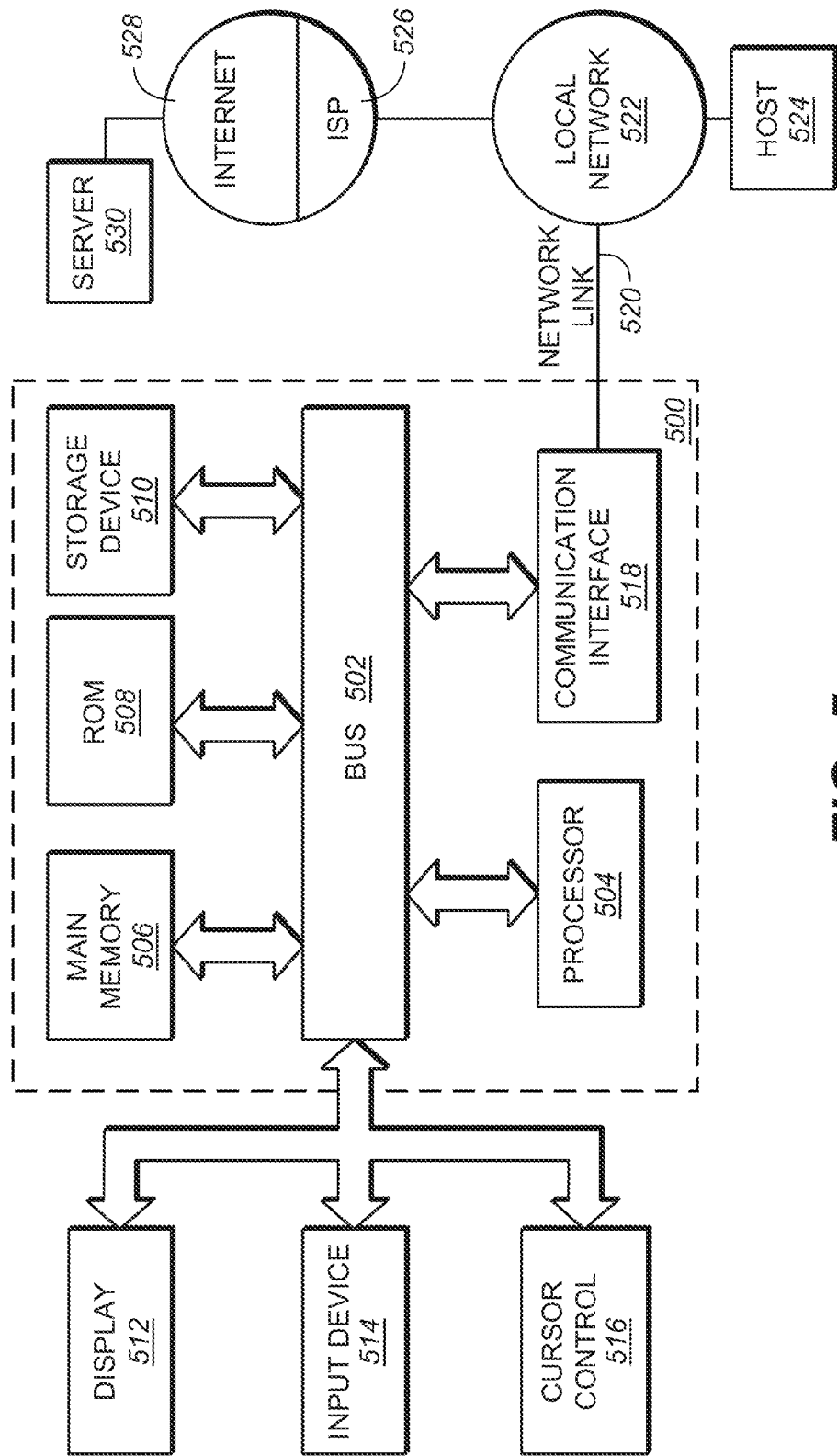
FIG. 5 illustrates an example hardware platform on which a computer or a computing device as described herein may be implemented.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hardwired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

8. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
 receiving a wide dynamic range image;
 generating a control map of false contour filtering for a predicted image, the predicted image being predicted from a low dynamic range image mapped from the wide dynamic range image;
 determining, based at least in part on the control map of false contour filtering and the predicted image, one or more filter parameters for a sparse finite-impulse-response (FIR) filter;
 applying the sparse FIR filter to filter pixel values in a portion of the predicted image based at least in part on the control map of false contour filtering;
 encoding the control map of false contour filtering into a part of a multi-layer video signal that includes the low dynamic range image; and,
 encoding the one or more filter parameters for the sparse FIR filter as a part of the multi-layer video signal that includes the low dynamic range image.

2. The method as recited in claim 1, wherein the wide dynamic range image is in a plurality of wide dynamic range images that form a scene, and wherein image data derived from the plurality of wide dynamic range images is encoded in the multi-layer video signal.

3. The method as recited in claim 1, wherein the low dynamic range image is encoded as a part of base-layer (BL) image data in the multi-layer video signal.

4. The method as recited in claim 1, further comprising:
generating residual values based at least in part on the prediction image as filtered by the sparse FIR filter and the wide dynamic range image;
applying non-linear quantization to the residual values to generate enhancement layer (EL) image data; and
encoding the EL image data into the multi-layer video signal.

5. The method as recited in claim 1, wherein one of the one or more filter parameters represents a number of taps in the sparse FIR filter; and wherein the number of taps is constrained to be no more than a fixed number.

6. The method as recited in claim 1, wherein the control map of false contour filtering is a block-level control map derived from a pixel-level control map of false contour filtering.

7. The method as recited in claim 1, wherein the control map of false contour filtering is a shrunk control map of false contour filtering derived from an unshrunk control map of false contour filtering.

8. The method as recited in claim 1, wherein weights of two or more taps in the sparse FIR filter are of a same value.

9. The method as recited in claim 1, wherein at least two weights of two or more taps in the sparse FIR filter are of different values.

10. The method as recited in claim 1, wherein two or more pixel intervals between two or more pairs of adjacent taps in the sparse FIR filter are of a same value.

11. The method as recited in claim 1, wherein at least two pixel intervals in two or more pixel intervals between two or more pairs of adjacent taps in the sparse FIR filter are of different values.

12. The method as recited in claim 1, wherein a second different sparse FIR filter is used to filter a second different portion of the predicted image.

13. The method as recited in claim 1, wherein the sparse FIR filter is used to filter an entire area of the predicted image.

14. The method as recited in claim 1, wherein the sparse FIR filter is used to filter pixel values for a specific channel in a plurality of channels of a color space.

15. The method as recited in claim 12, wherein the plurality of channels comprises one or more of a luminance channel, a chroma channel, a red color channel, a blue color channel, a green color channel, or other primary channels.

16. The method as recited in claim 1, wherein base layer (BL) image data derived from wide dynamic range images is compressed by a first encoder into the multi-layer video signal, and wherein enhancement layer (EL) image data derived from the wide dynamic range images is compressed by a second encoder in the multi-layer encoder into the multi-layer video signal.

17. A non-transitory computer readable storage medium, storing software instructions, which when executed by one or more processors cause performance of the method recited in claim 1.

18. A computing device comprising one or more processors and one or more storage media, storing a set of instructions, which when executed by one or more processors cause performance of the method recited in claim 1.

* * * * *